United States Patent
Abe et al.

(10) Patent No.: US 6,984,800 B2
(45) Date of Patent: Jan. 10, 2006

(54) WIRE ELECTRIC DISCHARGE MACHINE

(75) Inventors: Hiroyuki Abe, Yamanashi (JP); Toshiyuki Ogata, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/956,072

(22) Filed: Oct. 4, 2004

(65) Prior Publication Data

US 2005/0072760 A1 Apr. 7, 2005

(30) Foreign Application Priority Data

Oct. 7, 2003 (JP) .................................... 2003-348797

(51) Int. Cl.
*B23H 7/10* (2006.01)

(52) U.S. Cl. ................................. 219/69.12
(58) Field of Classification Search ............... 219/69.12
See application file for complete search history.

(56) References Cited

U.S. PATENT DOCUMENTS 4,783,583 A * 11/1988 Obara et al. ............. 219/69.12
5,055,649 A * 10/1991 Iwasaki et al. .......... 219/69.12

FOREIGN PATENT DOCUMENTS

| JP | 62-102920 A | * | 5/1987 |
| JP | 4-41123 A | * | 2/1992 |
| JP | 7-299660 | | 11/1995 |

* cited by examiner

*Primary Examiner*—Geoffrey S. Evans
(74) *Attorney, Agent, or Firm*—Staas & Halsey LLP (57) ABSTRACT

A wire electric discharge machine capable of adjusting spacing between a nozzle and a workpiece without manual operation and without causing damage to a machine and a workpiece. The wire electric discharge machine includes wire supply apparatus for supplying a wire electrode through the wire guide toward the workpiece; wire supply-amount measuring apparatus for measuring a supply amount of the wire electrode; wire front-end detecting apparatus for detecting a front end of the wire electrode being supplied by the wire supply apparatus at a wire front-end detecting position; and wire contact detecting apparatus for detecting contact of the front end of the wire electrode with an upper surface of the workpiece. A position of the upper surface of the workpiece is determined based on the wire front-end detecting position and a supply amount of the wire electrode measured by the supply amount measuring apparatus from when the front end of the workpiece is detected by the wire front-end detecting apparatus till the contact of the front end of the wire electrode with the upper surface of the workpiece is detected by the wire contact detecting apparatus.

16 Claims, 7 Drawing Sheets

S21 SETTING OF DESIRED VALUE OF NOZZLE SPACING AMOUNT BY MANUAL INPUT OR PROGRAM CODE

S22 PERFORM SEQUENCE OF NOZZLE SPACING MEASUREMENT

S23 MOVE TABLE SUCH THAT NOZZLE CONFRONTS MACHINING START HOLE

S24 CONNECT WIRE ELECTRODE

S25 OBTAIN TARGET VALUE OF UPPER GUIDE POSITION BASED ON DESIRED VALUE OF SPACING AMOUNT AND POSITION OF UPPER SURFACE OF WORKPIECE

S26 ISSUE MOTION COMMAND TO Z-AXIS SO THAT UPPER GUIDE HAS TARGET POSITION

WIRE ELECTRIC DISCHARGE MACHINE

BACKGROUND OF THE INVENTION

1. Field of the Invention

The present invention relates to a wire electric discharge machine, and more specifically to adjustment of spacing between a workpiece and an upper nozzle.

2. Description of the Related Art

Regarding a wire electric discharge machine, in order to retain normal accuracy in machining a workpiece and to achieve the machining speed, it is required to adjust and locate an upper nozzle provided to an upper guide so that the nozzle is located at a fixed distance from the upper surface of the workpiece.

The spacing adjustment of the nozzle has conventionally been made by the operator through the steps of inserting a feeler gauge between the upper nozzle and the workpiece, and moving a Z-axis up and down while checking the spacing, to thereby locate the Z-axis so that the desired upper nozzle spacing may be gained.

Since such an adjustment using the feeler gauge is performed manually, there are problems that it takes time to carry out an adjustment and that the adjusted spacing distance varies. On the contrary, a nonmanual spacing adjustment has been suggested. As for such a spacing adjustment, there has been suggested, for example, a nozzle equipment for wire-cut electrical discharge machining, in which the nozzle is separated from the workpiece at a predetermined distance after being brought into contact to the workpiece (for example, see Japanese Patent No. 2576050).

According to the above-mentioned nozzle equipment for wire-cut electrical discharge machining, since the nozzle is brought into direct contact with the workpiece at the time of measurement of the spacing between the nozzle and the workpiece, there are problems that the machine is damaged by being pushed by the workpiece due to contact to be deformed, and that the workpiece receives damage from the nozzle.

SUMMARY OF THE INVENTION

The present invention provides a wire electric discharge machine capable of measuring a spacing amount between a nozzle and a workpiece without manual operation and without causing damage to the machine and the workpiece.

According to the present invention, the spacing mount between the nozzle and the workpiece is determined using a supply amount of the wire electrode which is supplied from a wire guide and brought into contact with the workpiece. This makes it possible to measure the spacing amount and/or a position of an upper surface of the workpiece without applying a great force directly to the machine or workpiece and without manual operation. The spacing amount is automatically measured and a machining condition is automatically altered in accordance with the spacing amount, or the spacing amount is adjusted using measured spacing amount and/or the upper surface position of the workpiece.

A wire electric discharge machine of the present invention has a wire guide, a nozzle attached to the wire guide for supplying machining fluid, wire guide driving means for moving the wire guide, a table for mounting the workpiece, table driving means for moving the table and a controller for controlling electric discharge machining accordance to a machining program. According to an aspect of the present invention, the wire electric discharge machine comprises: wire supply means for supplying a wire electrode through the wire guide toward the workpiece; wire supply-amount measuring means for measuring a supply amount of the wire electrode; wire front-end detecting means for detecting a front end of the wire electrode being supplied by the wire supply means at a wire front-end detecting position; and wire contact detecting means for detecting contact of the front end of the wire electrode with an upper surface of the workpiece. A position of the upper surface of the workpiece is determined based on the wire front-end detecting position and a supply amount of the wire electrode measured by the supply amount measuring means from when the front end of the workpiece is detected by the wire front-end detecting means till the contact of the front end of the wire electrode with the upper surface of the workpiece is detected by the wire contact detecting means.

The wire front-end detecting position is spaced part from a position of the wire guide by a fixed distance, and thus is determined based on the position of the wire guide and the fixed distance.

The wire front-end detecting means detects the front end of the wire electrode at the wire front-end detecting position spaced apart from a position of the wire guide by a fixed distance, the wire supply means supplies the wire electrode until the wire contact detecting means detects contact between the wire electrode and the workpiece, and a coordinate value representing the front-end detecting position is determined by subtracting a coordinate value representing the position of the wire guide by the fixed distance, and a coordinate position of the position of the upper surface of the workpiece is determined by subtracting a coordinate value representing the position of the wire guide by the measured supply amount of the wire electrode.

The wire electric discharge machine may further comprise means for setting a target value of a nozzle spacing amount between the nozzle and the upper surface of the workpiece. In this case, the wire guide-driving means moves the wire guide so that the nozzle spacing amount is adjusted to be the target value based on the determined position of the upper surface of the workpiece.

The wire electric discharge machine may further comprise means for setting a machining condition in accordance with a nozzle spacing amount between the nozzle and the upper surface of the workpiece determined based on the position of the upper surface of the workpiece.

According to another aspect of the present invention, the wire electric discharge machine comprises: wire supply means for supplying a wire electrode through the wire guide toward the workpiece; wire supply-amount measuring means for measuring a supply amount of the wire electrode; wire front-end detecting means for detecting a front end of the wire electrode being supplied by the wire supply means at a wire front-end detecting position; and wire contact detecting means for detecting contact of the front end of the wire electrode with an upper surface of the workpiece. A nozzle spacing amount between the nozzle and the upper surface of the workpiece is determined based on a supply amount of the wire electrode measured by the supply amount measuring means from when the front end of the workpiece is detected by the wire front-end detecting means until the contact of the front end of the wire electrode with the upper surface of the workpiece is detected by the wire contact detecting means.

The nozzle spacing amount is determined by adding the measured supply amount of the wire electrode to a distance between the wire front-end detecting position and a distal end of the nozzle.

The wire electric discharge machine may further comprise means for setting a machining condition in accordance with the determined nozzle spacing amount.

The controller may control the wire supply means, the wire front-end detecting means and the wire contact detecting means in accordance with a command supplied by an input signal or a program code in the machining program.

The wire supply means may supply the wire electrode through the wire guide toward the workpiece after the controller reads and analyzes the machining program and calculates a machining start point on the workpiece, and the table-driving means moves the table such that the nozzle confronts the workpiece at a position displaced from the machining start point on the workpiece by a preset distance.

The wire front-end detecting means comprises a metal member fixed to the wire guide for detecting the front end of the wire electrode by contact of the front end of the wire electrode with the metal member.

The wire supply amount-measuring means may comprise a position sensor for detecting operation of the wire supply means.

According to the present invention, it is possible to automatically measure the nozzle spacing amount in the successive machining, to automatically alter the machining condition in accordance with the nozzle spacing amount, and to adjust the nozzle spacing.

DETAILED DESCRIPTION

A wire electric discharge machine of the present invention will be described below with reference to the attached drawings.

Figure 1:
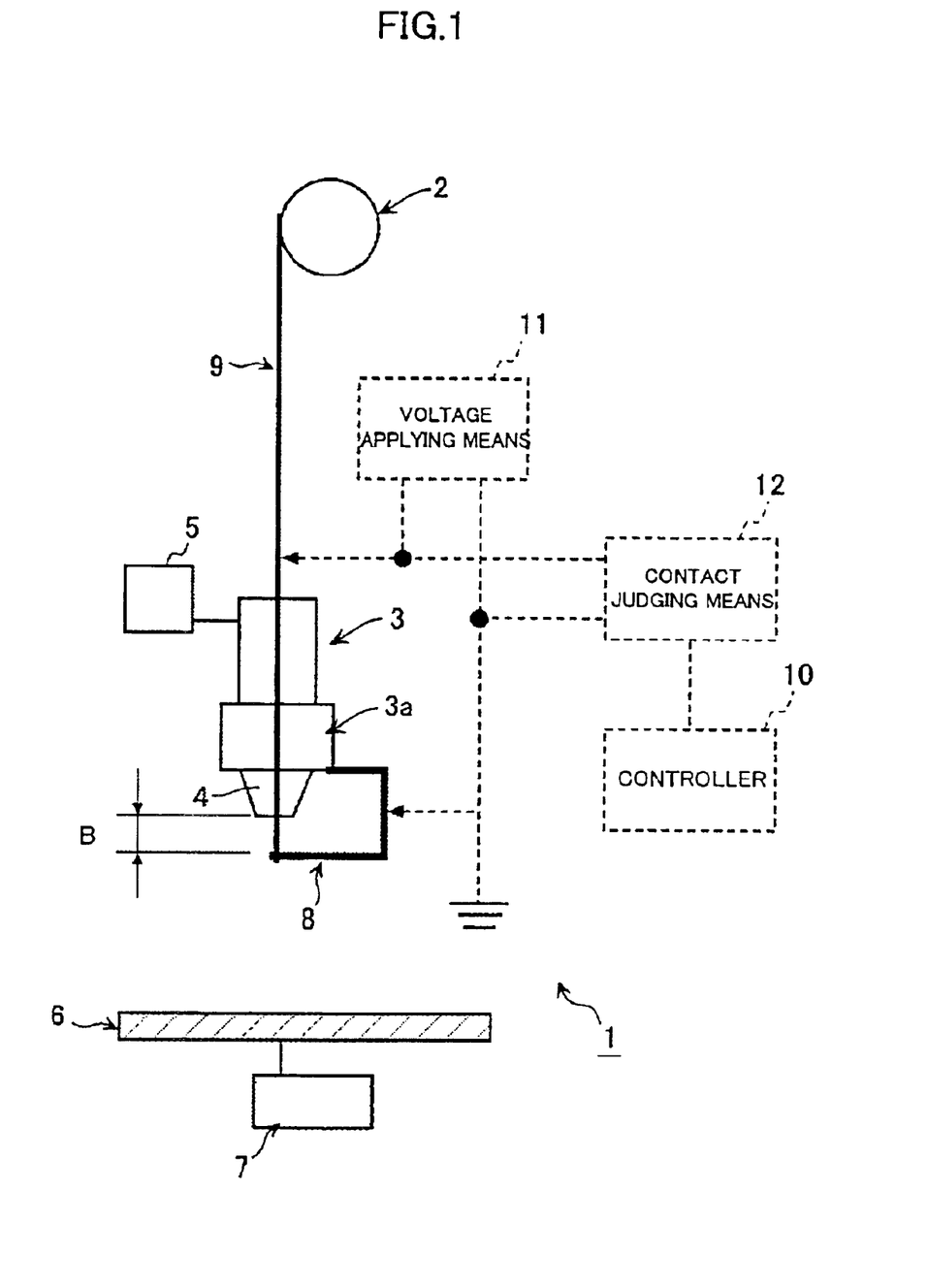
FIG. 1 is a schematic view of a configuration for explaining one example of a configuration of a wire electric discharge machine according to the present invention.

FIG. 1 is a schematic view of a configuration for explaining one example of a configuration of the wire electric discharge machine according to the present invention. In FIG. 1, a wire electric discharge machine 1 comprises wire electrode-supplying means 2, a wire guide 3, a nozzle 4 fixed to the wire guide 3, wire guide-driving means 5, a table 6 on which a workpiece (not shown) is mounted, table-driving means 7 for driving the table 6, and a controller 10 for controlling machining in accordance to a command. The controller 10 drives the table 6 while causing a wire electrode 9 to be supplied according to a command, and simultaneously supplies machining fluid from the nozzle 4 to machine the workpiece.

In addition to the aforementioned configuration, the wire electric discharge machine 1 further has wire front-end adjusting means for adjusting a position of a front end of the wire electrode 9, wire supply amount-measuring means for measuring a supply amount of the wire electrode 9, and wire-detecting means for detecting contact between the wire electrode 9 and the workpiece.

The wire front-end adjusting means may consist of the wire electrode-supplying means 2, a wire front-end detecting component 8, voltage-applying means 11, and contact-judging means 12, as one example of a configuration. The wire front-end detecting component 8 has a contact point with the wire electrode 9 at a wire front-end detecting position spaced part from an end of an upper guide 3a of the wire guide 3 by a fixed distance B. The wire front-end detecting component 8 is an electrode member that is delivered from the nozzle and extends along a path of the wire electrode 9, and is connected to one output terminal of the voltage-applying means 11. In FIG. 1, the wire front-end detecting component 8 consists of a U-shaped conductive material (for example, metal material) having one end attached to the upper guide 3a.

The other output terminal of the voltage-applying means 11 is connected to the wire electrode 9. The wire electrode 9 travels along with wire supply, so that the connection with the other output terminal of the voltage-applying means 11 is made slidable by a brush contact point, a roller contact point, or the like. A roller 13 for detecting a wire end position in FIG. 4 shows an example of a configuration according to the roller contact point.

The wire electrode 9 delivered from the wire electrode-supplying means 2 is exposed from the upper guide 3a to the outside and travels up to the wire front-end detecting position located at the fixed distance B from the upper guide 3a. An end of the wire electrode 9 comes in contact with the wire front-end detecting component 8 at the wire front-end detecting position. This contact makes a closed circuit consisting of one terminal of the voltage-applying means 11, the wire front-end detecting component 8, the wire electrode 9, and the other terminal of the voltage-applying means 11. The closed circuit constructs a first detection circuit for detecting that the wire front-end adjustment is completed.

The contact-judging means 12 detects electric current that flows through the closed circuit, to thereby detect that the end of the wire electrode 9 reaches the wire front-end detecting component 8. Since distance between the wire front-end detecting component 8 and the upper guide 3a is fixed to be the distance B, it is possible to adjust the front end of the wire electrode 9 at the wire front-end detecting position as a wire front-end adjusting position by detecting contact between the wire electrode 9 and the wire front-end detecting component 8 using the contact-judging means 12.

The wire supply amount-measuring means is means for figuring out the supply amount of the wire electrode 9, and may consist of, for example, an encoder coupled to a supply roller, not shown, of the wire electrode-supplying means 2.

The wire-detecting means is means for detecting the contact between the wire electrode 9 and the workpiece, and may consist of the voltage-applying means 11 and the contact-judging means 12 as one example of a configuration. The one output terminal of the voltage-applying means 11 is grounded, and the other output terminal thereof is connected to the wire electrode 9. The grounded output terminal is electrically connected to the workpiece, not shown, through the table 6. Since the wire electrode 9 travels along with wire supply, the connection with the other output terminal of the voltage-applying means 11 is, as stated above, made slidable by the brush contact point, the roller contact point, or the like. The roller 13 illustrated in FIG. 4 shows an example of a configuration according to the roller contact point. This connection may be used with a configuration of the wire front-end adjusting means.

The wire electrode 9 delivered from the wire electrode-supplying means 2 contacts the upper surface of the workpiece, not shown, placed on the table 6. This contact forms a closed circuit consisting of the one terminal of the voltage-applying means 11, an earth, the table 6, the workpiece, not shown, the wire electrode 9, and the other terminal of the voltage-applying means 11. The closed circuit constructs a second detection circuit for detecting that the end of the wire electrode 9 contacts the upper surface of the workpiece.

The contact-judging means 12 detects electric current that flows through the closed circuit, to thereby detect that the end of the wire electrode 9 contacts the upper surface of the workpiece.

Control of the front-end adjusting performed by the wire front-end adjusting means and control of contact between the wire electrode and the workpiece which is detected by the wire-detecting means are carried out by the controller 10. The first detection circuit for detecting the front end of the wire and the second detection circuit for detecting that the wire electrode contacts the upper surface of the workpiece share the voltage-applying means 11 and the contact-judging means 12 as common constituents. Therefore, the controller 10 switches these detection circuits and implements the wire front-end adjusting control and the contact control.

The wire electric discharge machine 1 according to the present invention makes it possible to practice an embodiment in which spacing is adjusted and one in which machining conditions are changed on the basis of the spacing amount. Each of these embodiments can be carried out not only in a process of finding the workpiece upper surface position but in a process of finding the amount of spacing between the nozzle and the workpiece upper surface.

In the embodiment in which the workpiece upper surface position is obtained, the front-end adjusting position (Y) of the wire electrode by the wire front-end adjusting means and a supply amount (X) of the wire electrode supplied from the wire front-end adjustment until the wire electrode comes into contact with the workpiece are obtained. Subsequently, the workpiece upper surface position (W) is determined based on a difference between the obtained front-end adjusting position (Y) and the obtained wire electrode supply amount (X): (W=Y−X). The wire electrode supply amount (X) can be obtained from a wire supply amount measured by the wire supply amount-measuring means from when the front end of the wire electrode is adjusted until the wire-detecting means detects contact between the wire electrode and the workpiece.

According to the embodiment in which a nozzle spacing amount between a distal end of the nozzle and the upper surface of the workpiece is obtained, the nozzle spacing amount (S) can be determined by adding a distance (B) between the distal end of the nozzle 3a and the front-end adjusting position to the supply amount (X) measured from when the front end of the wire electrode is adjusted until the wire-detecting means detects contact between the wire electrode and the workpiece.

In the embodiment in which the nozzle spacing is adjusted, the process of determining the workpiece upper surface position can be applied. In this case, there is provided nozzle spacing-setting means for setting a target value (N) of the nozzle spacing amount. The wire guide-driving means 5 drives a wire guide 3, based on the workpiece upper surface position (W) and the target value (N) of the nozzle spacing amount by the nozzle spacing-setting means, to thereby make the nozzle spacing amount equal to the target value (N).

In the embodiment in which machining conditions are altered according to the spacing amount, not only a process using the spacing amount determined from the workpiece upper surface position but also a process of determining the nozzle spacing amount based on the wire electrode supply amount (X) and the distance (B) between the distal end of the nozzle and the front-end adjusting position can be applied.

A sequence of the spacing measurement of the upper nozzle, adjustment of the upper nozzle spacing amount, which is made on the basis of the workpiece upper surface position obtained in the sequence of the upper nozzle spacing measurement, and setting of machining conditions according to the spacing amount found in the sequence of the upper nozzle spacing measurement will be described below.

Figure 4A:
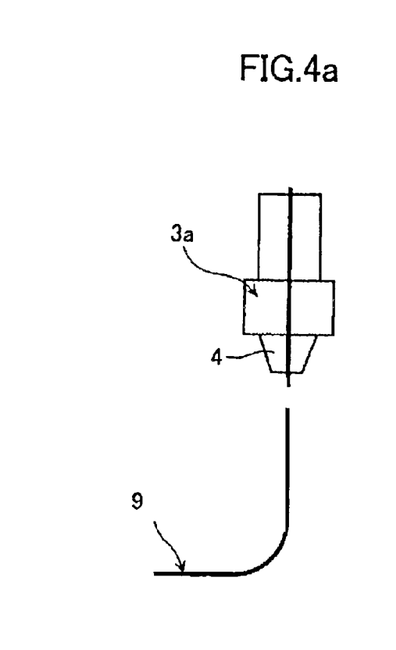
FIGS. 4a–4d are explanatory views of a procedure of the measurement sequence according to the present invention.
Figure 4B:
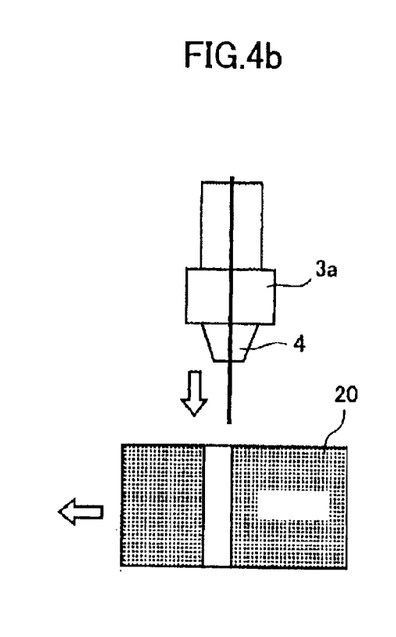
Figure 4C:
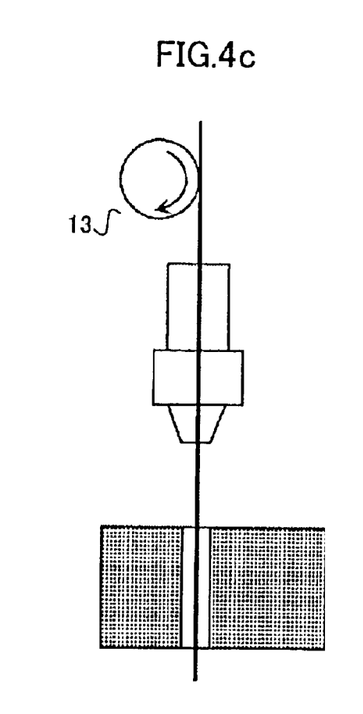
Figure 5:
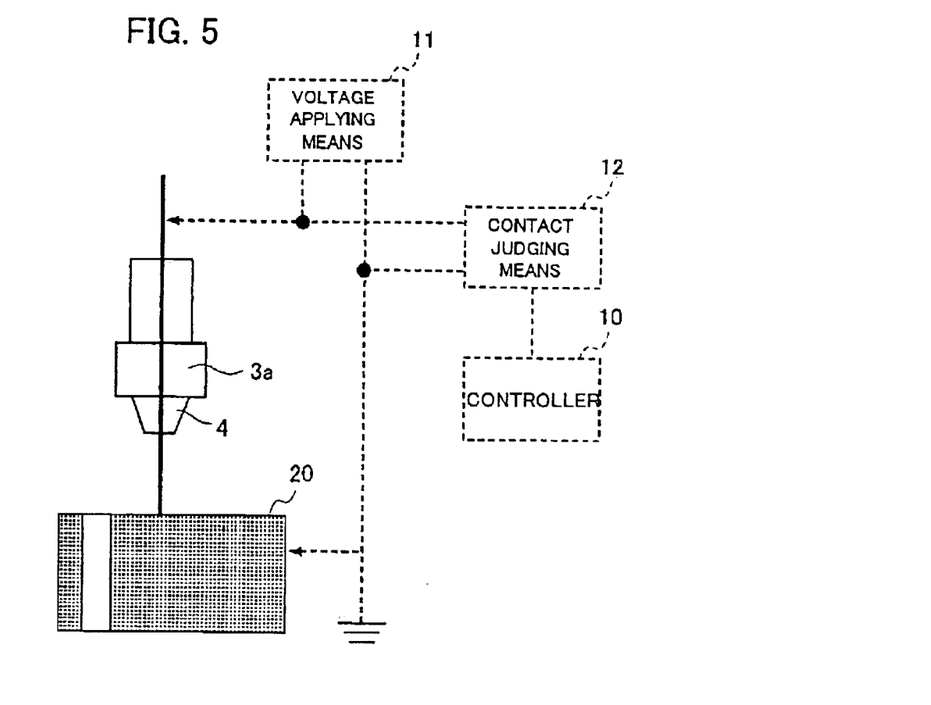
FIG. 5 is an explanatory view of detection of contact between an electrode wire and a workpiece in the measurement sequence according to the present invention.
Figure 6:
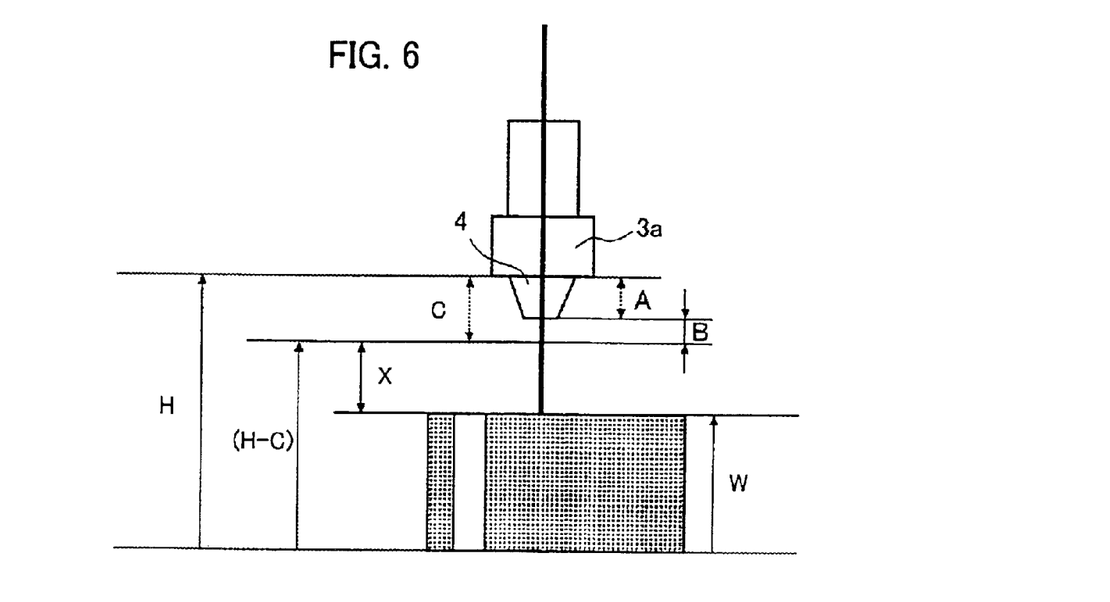
FIG. 6 is an explanatory view of calculation of an upper surface position of the wire in the measurement sequence according to the present invention.

First of all, the sequence of the upper nozzle spacing measurement will be explained with reference to a flowchart of FIG. 2 and FIGS. 4 through 7. FIG. 4 is a view for explaining a procedure of the measurement sequence; FIG. 5 for explaining the detection of contact between the electrode wire and the workpiece in the measurement sequence; FIG. 6 for explaining calculation of the upper surface position of the wire in the measurement sequence; and FIG. 7 for explaining calculation of the spacing amount in the measurement sequence.

Figure 2:
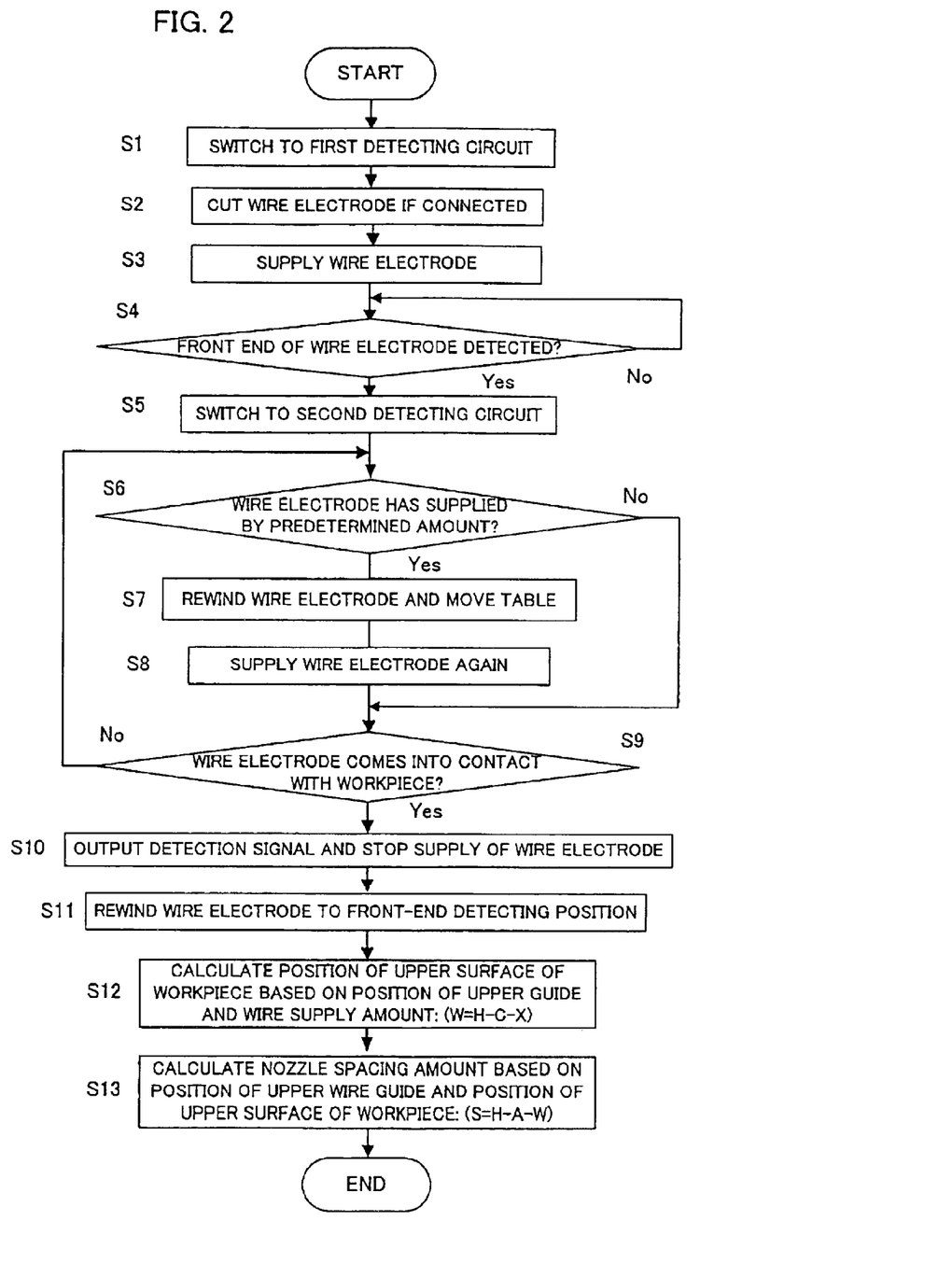
FIG. 2 is a flowchart for explaining a sequence of an upper nozzle spacing measurement according to the present invention.

First, an upper nozzle spacing measuring mode is set by a command and the controller 10 starts a procedure as shown in FIG. 2 to determine the workpiece upper surface position and/or the spacing amount of the upper nozzle. The command may be supplied by an outside signal to the controller 10 or by a program stored in the controller 10.

First, the controller switches over to the first detection circuit for detecting the front end of the wire electrode (Step S1).

The wire front-end adjustment is carried out in Steps S2 through S4. As illustrated in FIG. 4a, in case that the wire electrode 9 is connected, the wire electrode 9 is cut off (Step S2). After the cutting is confirmed, a position of the front end of the wire electrode 9 is adjusted. The cutting of the wire electrode 9 can be confirmed by the first detection circuit. In the first detection circuit, if the wire electrode is cut off, and the end thereof is not in contact to the wire front-end detecting component 8, there is a gap between the upper guide 3a (nozzle 4) and the wire front-end detecting component 8, which means that the circuit is in an open state. The contact-judging means 12 can confirm the cutting by detecting the open state of the circuit.

The cutting can be confirmed also from a state of supplying electric current to the wire electrode 9. A nonconductive state with respect to the wire electrode 9 affirms the cutting.

After the cutting of the wire electrode 9 is confirmed, the wire electrode 9 is supplied by the wire electrode-supplying means 2 (Step S3). The supplied wire electrode 9 is brought into contact with the wire front-end detecting component 8 before reaching the upper surface of the workpiece. Once the wire electrode 9 contacts the wire front-end detecting component 8, the first detection circuit forms the closed circuit. The contact-judging means 12 detects that the first detection circuit is closed (Step S4).

Since, the wire front-end detecting position of the wire front-end detecting component 8 is set to be spaced apart from the end of the upper guide 3a by a fixed distance (distance B, for example), the position of the front end of the wire electrode 9 is adjusted to coincide with the wire front-end detecting position.

After the distal end of the wire electrode 9 is detected at the wire front-end detecting position, the first detection circuit is switched over to the second detection circuit. The second detection circuit detects that the end of the wire electrode 9 contacts the upper surface of a workpiece 20, and the contact can be detected by using the contact-judging means 12, like the first detection circuit. The second detection circuit is in an open state when the distal end of the wire electrode 9 is detected at the fixed position.

In the state where the second detection circuit is open, the wire electrode 9 is delivered by the wire electrode-supplying means 2, and the end of the wire electrode 9 is brought into contact to the upper surface of the workpiece 20 by following Steps S6 through S9.

In case that the end of the wire electrode 9 contacts the upper surface of the workpiece 20, the second detection circuit is closed, and the contact is detected by the contact-judging means 12 (Step S9). FIG. 5 shows an example of a configuration of the second detection circuit. Based on a detection signal, the controller 10 stops the wire electrode-supplying means 2 to discontinue the deliver of the wire electrode 9 (Step S10).

If the delivered wire electrode 9, for example, passes through a starting hole of the workpiece 20 or is not aligned with the workpiece 20, there will be no contact between the wire electrode 9 and the workpiece 20. For this reason, as illustrated in FIG. 4c, when the wire electrode 9 does not contact the workpiece 20 even if the wire electrode 9 of a preset amount or more is delivered (Step S6), the end of the wire electrode 9 is wound back to the front-end detecting position, and the table 6 is moved such that the wire guide 3 is located on the upper surface of the workpiece 20 (Step S7). Additionally, the preset amount or more of the supply amount can be set, for example, the same value as distance between the wire guide 3 at an upper position and the table 6.

Figure 4D:
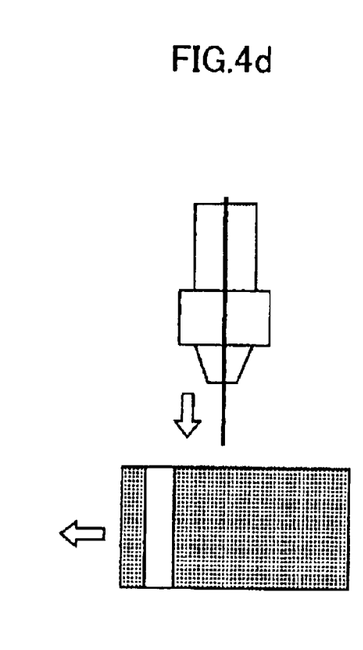

After the table 6 is displaced, as illustrated in FIG. 4d, the wire electrode 9 is supplied again (Step S8). The contact-judging means 12 detects the contact between the wire electrode 9 and the workpiece 20 in Step S9. The controller 10 stops the wire electrode-supplying means 2 to discontinue the supply of the wire electrode 9, based on the detection signal.

Referring to FIG. 6 for explaining calculation of the wire upper surface position in the measurement sequence, where A is a length of the nozzle 4, and B is a distance between the distal end of the nozzle 4 and the wire front-end adjusting position, a distance C from the upper guide 3a to the wire front-end adjusting position equals (A+B).

Herein, when the upper guide 3a is positioned at a height (H) from the table surface as a reference level, the wire front-end adjusting position is expressed as (H−C). Supply amount (X) of the wire electrode 9, which is supplied by the wire electrode-supplying means 2 from the wire front-end detecting position until the wire electrode 9 contacts the upper surface of the workpiece 20, corresponds to a spacing amount between the wire front-end detecting position and the upper surface of the workpiece 20 in FIG. 6.

After the supply amount (X) of the wire electrode 9 is measured, the wire electrode 9 is rewound such that the front end of the wire electrode positions at the wire front-end detecting position (Step S11).

In FIG. 6, the workpiece upper surface position is represented by a coordinate value W with the table surface as the reference. The coordinate value W representing the workpiece upper surface position can be obtained based on the height H representing the present position of the upper guide, the supply amount X of the wire electrode 9 and the fixed distance C, and is expressed by an equation: $W=(H-C-X)$. Herein, the height (H) of the upper guide 3a can be found from position control of the upper guide 3a. For instance, the height (H) of the upper guide can be obtained from a command to control the wire guide-driving means 5.

Since the distance (C) is of a fixed value and the present height (H) of the upper guide is also a value determined by command, the workpiece upper surface position can be obtained by finding the supply amount (X) of the wire electrode 9 (Step S12).

Figure 7:
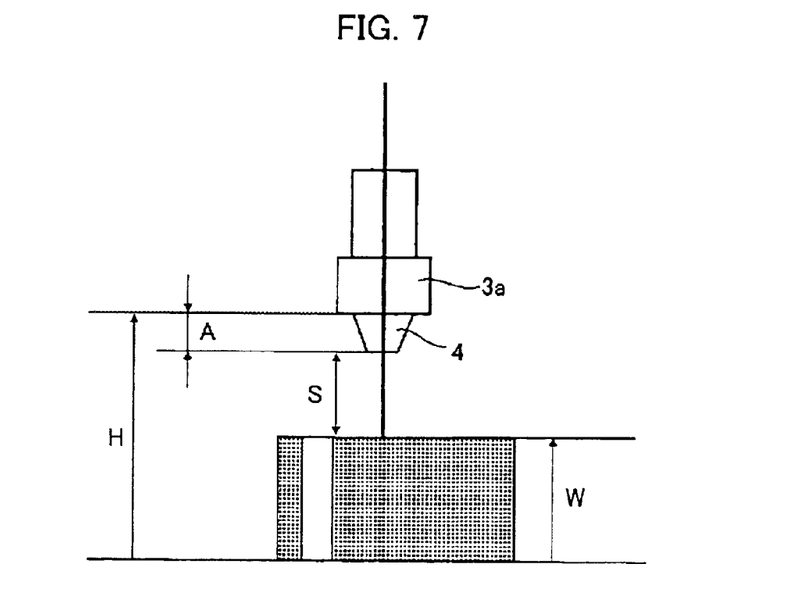
FIG. 7 is an explanatory view of calculation of a spacing amount in the measurement sequence according to the present invention.

Referring to FIG. 7 for explaining calculation of a spacing amount in the measurement sequence, the spacing amount (S) between the end of the nozzle 4 and the upper surface of the workpiece 20 can be determined from the present height (H) of the upper guide, the workpiece upper surface position (W), and the length (A) of the nozzle 4, and is expressed by an equation, $S=(H-A-W)$.

Herein, the present height (H) of the upper guide can be found by the position control of the upper guide as stated above, and the length (A) of the nozzle 4 is a value previously determined. Consequently, the spacing amount (S) can be obtained from the workpiece upper surface position (Step S13).

The spacing amount (S) can be determined not only based on the present height (H) of the upper guide, the workpiece upper surface position and the length (A) of the nozzle 4, but also based on the supply amount (X) of the wire electrode 9 and the distance (B) between the distal end of the nozzle 4 and the wire front-end adjusting position.

In FIG. 6, the spacing amount (S) can be figured out using the distance (C), the length (A) of the nozzle 4, and the supply amount (X) of the wire electrode 9, which is expressed by an equation, $S=(C-A+X)$. Herein, since the distance (C) and the length (A) of the nozzle 4 are the fixed values, the spacing amount (S) can be found from the supply amount (X) of the wire electrode 9 (Step S14 in the flowchart of FIG. 3).

The wire electric discharge machine of the present invention is capable of adjusting the spacing amount of the nozzle using the workpiece upper surface position obtained through the above procedure and of changing the machining conditions according to the spacing amount (S).

The adjustment of the spacing amount of the upper nozzle will be first described.

Figure 8:
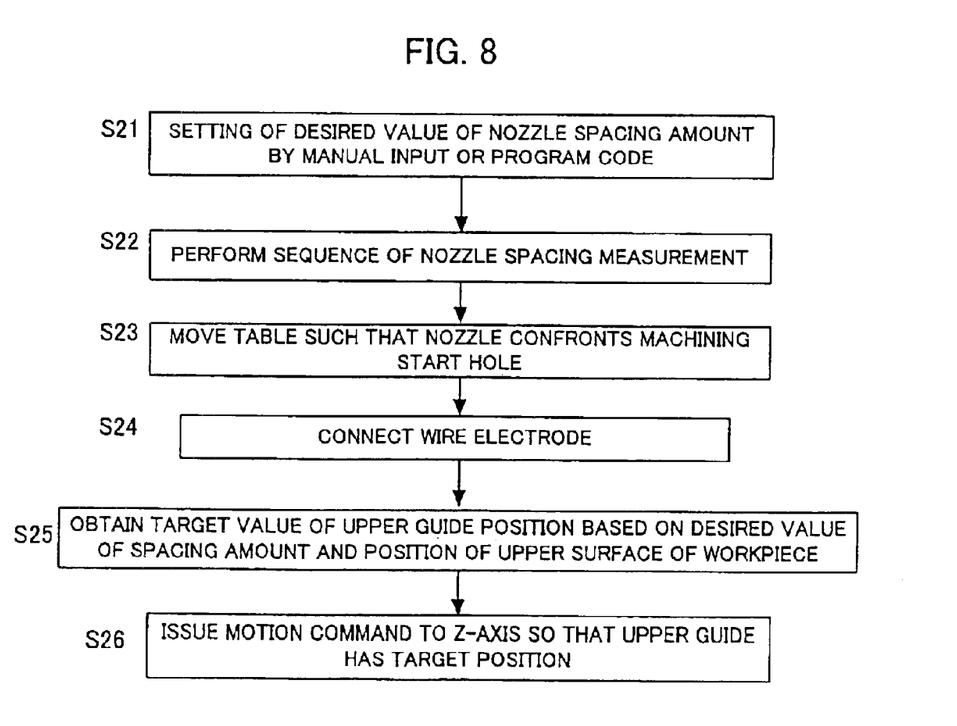
FIG. 8 is a flowchart for explaining an adjustment of the spacing amount of the upper nozzle according to the present invention.
Figure 9A:
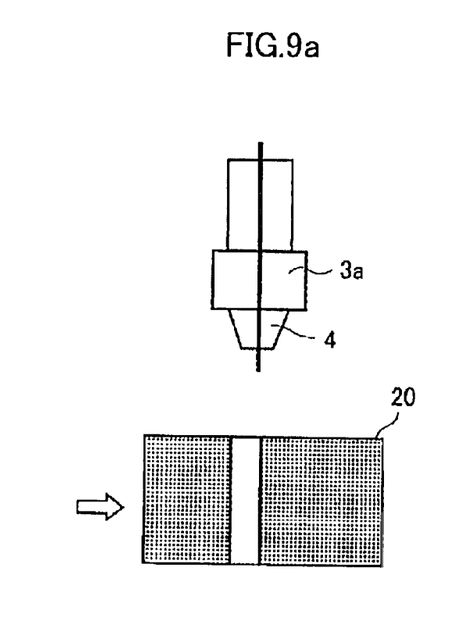
FIGS. 9a–9c are schematic views for explaining the adjustment of the spacing amount of the upper nozzle according to the present invention.
Figure 9B:
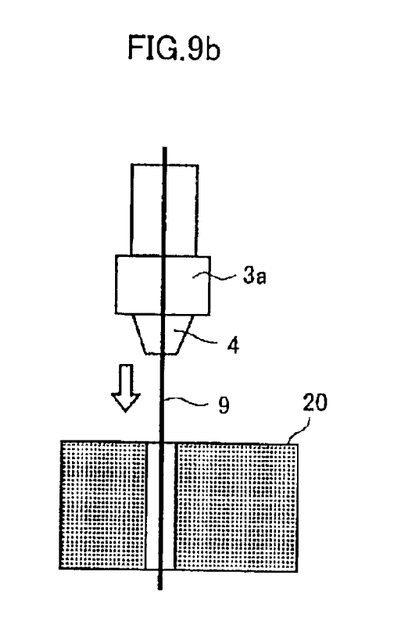
Figure 9C:
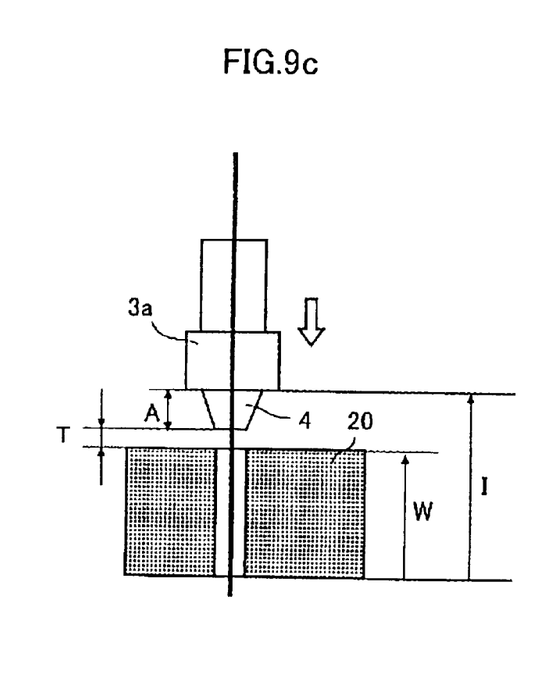

FIGS. 8 and 9 are a flowchart and a schematic view, respectively, for explaining the adjustment of the spacing amount of the upper nozzle.

First, a desired value (T) of the nozzle spacing amount is set. The setting of the desired value (T) of the nozzle spacing amount can be inputted through input means referring to a display screen of the controller 10 or by a program code (Step S21).

Figure 3:
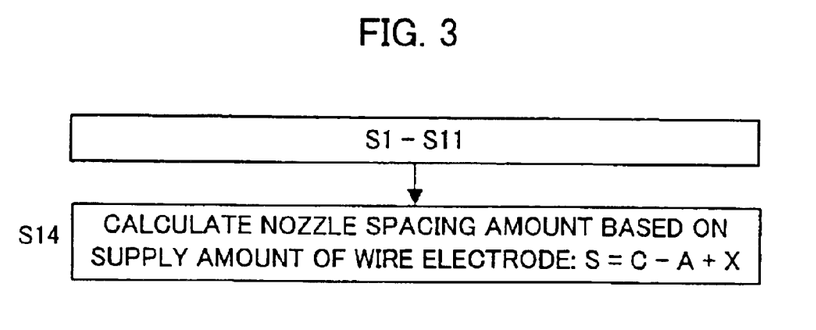
FIG. 3 is a flowchart for explaining a sequence of an upper nozzle spacing measurement according to the present invention.

Subsequently, the sequence of nozzle spacing measurement as shown in FIG. 2 or FIG. 3 are performed to thereby determine the workpiece upper surface position (W) or the nozzle spacing amount (S) (Step S22). The table is moved such that the nozzle 3a confronts the machining start hole of the workpiece as illustrated in FIG. 9a (Step S23), and the wire is connected as shown in FIG. 9b (Step S24).

A target vale (I) of the upper guide position is obtained from the desired value (T) of the nozzle spacing amount and the workpiece upper surface position according to equation: I=(W+A+T) (Step S25). As illustrated in FIG. 9c, a motion command is given to a Z-axis so that the position of the upper guide 3a is equal to the target value (I). Alternatively, the upper nozzle 3a may be moved by a difference between the determined nozzle spacing amount (S) and the desired value (T) of the nozzle spacing amount. With the above positioning of the upper guide 3a, the nozzle spacing amount between the nozzle and the upper surface of the workpiece is adjusted to be desired value (T) (Step S26).

Figure 10:
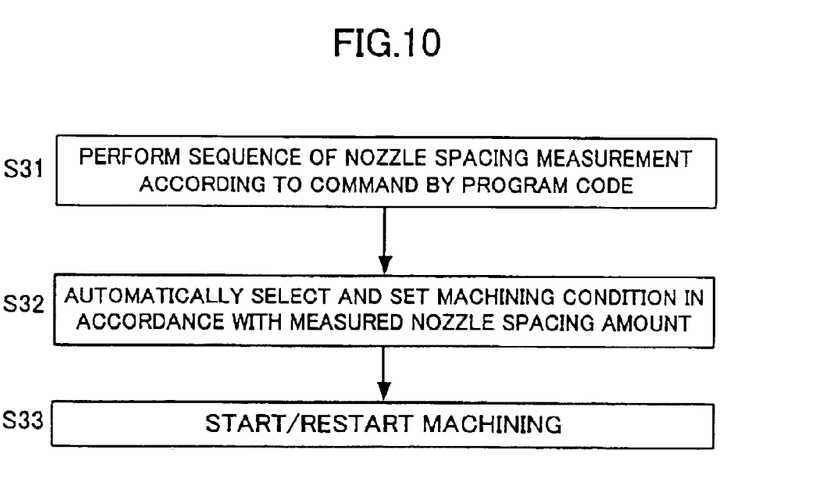
FIG. 10 is a flowchart for explaining alteration of machining conditions according to the spacing amount of the present invention.

Next, the alteration of machining conditions according to the spacing amount (S) will be described with reference to a flowchart of FIG. 10.

The spacing amount (S) is determined by performing the sequence of upper nozzle spacing measurement as shown in FIG. 2 or FIG. 3 (Step S31). A machining condition in accordance with the determined nozzle spacing amount (S) is automatically selected and set (Step S32). Various set values of the machining condition regarding the nozzle spacing amount are stored in storage means in the controller 10.

After the machining condition is set, the machining is started. If the spacing amount (S) is changed in the successive machining, Steps S31 and S32 are repeatedly carried out to re-set the machining condition in accordance with the determined spacing amount (S), and the machining is restarted (Step S33).

According to the present invention, since the upper nozzle is not brought into contact with the workpiece, possible damage to the machine of the wire electric discharge machine is reduced. As described, technology of the present invention can be applied to the automatic adjustment of the spacing amount of the upper nozzle and also to automatic alteration of the machining condition in accordance with changes of the spacing amount.

What is claimed is:

1. A wire electric discharge machine for performing electric discharge machining on a workpiece, having a wire guide, a nozzle attached to said wire guide for supplying machining fluid, wire guide driving means for moving the wire guide, a table for mounting the workpiece, table driving means for moving the table and a controller for controlling the electric discharge machining accordance to a machining program, said machine comprising:
wire supply means for supplying a wire electrode through the wire guide toward the workpiece;
wire supply-amount measuring means for measuring a supply amount of the wire electrode;
wire front-end detecting means for detecting a front end of the wire electrode being supplied by said wire supply means at a wire front-end detecting position; and
wire contact detecting means for detecting contact of the front end of the wire electrode with an upper surface of the workpiece,
wherein a position of the upper surface of the workpiece is determined based on the wire front-end detecting position and a supply amount of the wire electrode measured by said supply amount measuring means from when the front end of the wire electrode is detected by said wire front-end detecting means till the contact of the front end of the wire electrode with the upper surface of the workpiece is detected by said wire contact detecting means.

2. A wire electric discharge machine according to claim 1, wherein the wire front-end detecting position is spaced part from a position of the wire guide by a fixed distance, and is determined based on the position of the wire guide and the fixed distance.

3. A wire electric discharge machine according to claim 1, wherein said wire front-end detecting means detects the front end of the wire electrode at the wire front-end detecting position spaced apart from a position of the wire guide by a fixed distance,
said wire supply means supplies the wire electrode until said wire contact detecting means detects contact between the wire electrode and the workpiece, and
a coordinate value representing the front-end detecting position is determined by subtracting a coordinate value representing the position of the wire guide by the fixed distance, and a coordinate position of the position of the upper surface of the workpiece is determined by subtracting a coordinate value representing the position of the wire guide by the measured supply amount of the wire electrode.

4. A wire electric discharge machine according to claim 1, further comprising means for setting a target value of a nozzle spacing amount between said nozzle and the upper surface of the workpiece,
wherein said wire guide-driving means moves said wire guide so that the nozzle spacing amount is adjusted to be the target value based on the determined position of the upper surface of the workpiece.

5. A wire electric discharge machine according to claim 1, further comprising means for setting a machining condition in accordance with a nozzle spacing amount between said nozzle and the upper surface of the workpiece determined based on the position of the upper surface of the workpiece.

6. A wire electric discharge machine according to claim 1, wherein said controller controls said wire supply means, said wire front-end detecting means and said wire contact detecting means in accordance with a command supplied by an input signal or a program code in the machining program.

7. A wire electric discharge machine according to claim 1, wherein said wire supply means supplies the wire electrode through the wire guide toward the workpiece after said controller reads and analyzes the machining program and calculates a machining start point on the workpiece, and said table-driving means moves the table such that the nozzle confronts the workpiece at a position displaced from the machining start point on the workpiece by a preset distance.

8. A wire electric discharge machine according to claim 1, wherein said wire front-end detecting means comprises a metal member fixed to said wire guide for detecting the front end of the wire electrode by contact of the front end of the wire electrode with the metal member.

9. A wire electric discharge machine according to claim 1, wherein said wire supply amount-measuring means comprises a position sensor for detecting operation of said wire supply means.

10. A wire electric discharge machine for performing electric discharge machining on a workpiece, having a wire guide, a nozzle attached to said wire guide for supplying machining fluid, wire guide driving means for moving the wire guide, a table for mounting the workpiece, table driving means for moving the table and a controller for controlling the electric discharge machining accordance to a machining program, said machine comprising:

wire supply means for supplying a wire electrode through the wire guide toward the workpiece;

wire supply-amount measuring means for measuring a supply amount of the wire electrode;

wire front-end detecting means for detecting a front end of the wire electrode being supplied by said wire supply means at a wire front-end detecting position; and wire contact detecting means for detecting contact of the front end of the wire electrode with an upper surface of the workpiece, wherein a nozzle spacing amount between said nozzle and the upper surface of the workpiece is determined based on a supply amount of the wire electrode measured by said supply amount measuring means from when the front end of the wire electrode is detected by said wire front-end detecting means until the contact of the front end of the wire electrode with the upper surface of the workpiece is detected by said wire contact detecting means.

11. A wire electric discharge machine according to claim 10, wherein the nozzle spacing amount is determined by adding the measured supply amount of the wire electrode to a distance between the wire front-end detecting position and a distal end of the nozzle.

12. A wire electric discharge machine according to claim 10, further comprising means for setting a machining condition in accordance with the determined nozzle spacing amount.

13. A wire electric discharge machine according to claim 10, wherein said controller controls said wire supply means, said wire front-end detecting means and said wire contact detecting means in accordance with a command supplied by an input signal or a program code in the machining program.

14. A wire electric discharge machine according to claim 10, wherein said wire supply means supplies the wire electrode through the wire guide toward the workpiece after said controller reads and analyzes the machining program and calculates a machining start point on the workpiece, and said table-driving means moves the table such that the nozzle confronts the workpiece at a position displaced from the machining start point on the workpiece by a preset distance.

15. A wire electric discharge machine according to claim 10, wherein said wire front-end detecting means comprises a metal member fixed to said wire guide for detecting the front end of the wire electrode by contact of the front end of the wire electrode with the metal member.

16. A wire electric discharge machine according to claim 10, wherein said wire supply amount-measuring means comprises a position sensor for detecting operation of said wire supply means.

* * * * *

UNITED STATES PATENT AND TRADEMARK OFFICE
CERTIFICATE OF CORRECTION

PATENT NO. : 6,984,800 B2  Page 1 of 3
APPLICATION NO. : 10/956072
DATED : January 10, 2006
INVENTOR(S) : Abe et al.

It is certified that error appears in the above-identified patent and that said Letters Patent is hereby corrected as shown below:

The title page showing the illustrative figure should be deleted to be replaced with the attached title page.

The drawing sheets, consisting of Fig.1, should be deleted to be replaced with the drawing sheets, consisting of Fig. 1, as shown on the attached page.

In the drawings: Fig. 1, change "CONTACT JUDGING" to --CONTACT-JUDGING--.

In the drawings: Fig. 5, change "CONTACT JUDGING" to --CONTACT-JUDGING--.

Column 1, line 34 (approx.), change "above-mentioned" to --above mentioned--.

Signed and Sealed this

Eighteenth Day of November, 2008

JON W. DUDAS
*Director of the United States Patent and Trademark Office*

United States Patent
Abe et al.

(12) United States Patent
(10) Patent No.: US 6,984,800 B2
(45) Date of Patent: Jan. 10, 2006

(54) WIRE ELECTRIC DISCHARGE MACHINE

(75) Inventors: Hiroyuki Abe, Yamanashi (JP); Toshiyuki Ogata, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/956,072

(22) Filed: Oct. 4, 2004

(65) Prior Publication Data
US 2005/0072760 A1 Apr. 7, 2005

(30) Foreign Application Priority Data
Oct. 7, 2003 (JP) .................... 2003-348797

(51) Int. Cl.
*B23H 7/10* (2006.01)

(52) U.S. Cl. .................................. 219/69.12
(58) Field of Classification Search ........... 219/69.12
See application file for complete search history.

(56) References Cited

U.S. PATENT DOCUMENTS 4,783,583 A * 11/1988 Obara et al. ........... 219/69.12
5,055,649 A * 10/1991 Iwasaki et al. .......... 219/69.12

FOREIGN PATENT DOCUMENTS

JP 62-102920 A * 5/1987
JP 4-41123 A * 2/1992
JP 7-299660 11/1995

* cited by examiner

*Primary Examiner*—Geoffrey S. Evans
(74) *Attorney, Agent, or Firm*—Staas & Halsey LLP (57) ABSTRACT

A wire electric discharge machine capable of adjusting spacing between a nozzle and a workpiece without manual operation and without causing damage to a machine and a workpiece. The wire electric discharge machine includes wire supply apparatus for supplying a wire electrode through the wire guide toward the workpiece; wire supply-amount measuring apparatus for measuring a supply amount of the wire electrode; wire front-end detecting apparatus for detecting a front end of the wire electrode being supplied by the wire supply apparatus at a wire front-end detecting position; and wire contact detecting apparatus for detecting contact of the front end of the wire electrode with an upper surface of the workpiece. A position of the upper surface of the workpiece is determined based on the wire front-end detecting position and a supply amount of the wire electrode measured by the supply amount measuring apparatus from when the front end of the workpiece is detected by the wire front-end detecting apparatus till the contact of the front end of the wire electrode with the upper surface of the workpiece is detected by the wire contact detecting apparatus.

16 Claims, 7 Drawing Sheets

FIG.1